United States Patent
Blackburn et al.

[19]

[11] Patent Number: 5,904,368
[45] Date of Patent: May 18, 1999

[54] OCCUPANT RESTRAINT SYSTEM AND CONTROL METHOD WITH VARIABLE SENSOR RATE AND/OR SAMPLE RATE

[75] Inventors: Brian K. Blackburn, Rochester; Joseph F. Mazur, Washington; Scott B. Gentry, Romeo, all of Mich.

[73] Assignees: TRW Inc.; TRW Vehicle Safety Systems Inc., both of Lyndhurst, Ohio

[21] Appl. No.: 08/931,132

[22] Filed: Sep. 16, 1997

[51] Int. Cl.⁶ ................................................ B60R 21/32
[52] U.S. Cl. ........................................ 280/735; 701/45
[58] Field of Search ........................... 280/735; 180/282; 701/45; 340/436, 438

[56] References Cited

U.S. PATENT DOCUMENTS

| | | | |
|---|---|---|---|
| 4,985,835 | 1/1991 | Sterler et al. | 280/735 |
| 5,071,160 | 12/1991 | White et al. | 280/735 |
| 5,118,134 | 6/1992 | Mattes et al. | 280/735 |
| 5,203,600 | 4/1993 | Watanabe et al. | 296/68.1 |
| 5,330,226 | 7/1994 | Gentry et al. | 280/735 |
| 5,366,241 | 11/1994 | Kithil | 280/735 |
| 5,398,185 | 3/1995 | Omura | 280/735 |
| 5,400,487 | 3/1995 | Gioutsos et al. | 280/735 |
| 5,413,378 | 5/1995 | Steffens, Jr. et al. | 280/735 |
| 5,445,413 | 8/1995 | Rudolf et al. | 280/735 |
| 5,446,661 | 8/1995 | Gioutsos et al. | 280/735 |
| 5,490,069 | 2/1996 | Gioutsos et al. | 280/735 |
| 5,829,782 | 11/1998 | Breed et al. | 280/735 |

OTHER PUBLICATIONS

U.S. Patent Appln. 08/931,602 to Mazur, et al. for Occupant Restraint System And Control Method With Variable Sense, Sample, And Determination Rates, filed Sep. 16, 1997.

*Primary Examiner*—Peter C. English
*Attorney, Agent, or Firm*—Tarolli, Sundheim, Covell, Tummino & Szabo

[57] ABSTRACT

An occupant restraint system (10), and an associated control method, for a vehicle (16). The system (10) includes an actuatable occupant restraint device (18). An ultrasound sensor (34) senses an occupant condition and provides a signal (38) indicative thereof. An ultrasound signal sampler function (46) of a controller (26) samples the signal (38) at a sample rate. A restraint control determination function (50) of the controller (26) makes determinations regarding control of the restraint device (18) using the signal samples. A rate determination function (52) determines the sensor and sample rates using the signal samples.

14 Claims, 4 Drawing Sheets

OCCUPANT RESTRAINT SYSTEM AND CONTROL METHOD WITH VARIABLE SENSOR RATE AND/OR SAMPLE RATE

TECHNICAL FIELD

The present invention is directed to a vehicle occupant restraint system and is particularly directed to control of occupant sensing within the system.

BACKGROUND OF THE INVENTION

Occupant restraint systems for use in vehicles are known in the art. One type of restraint system includes an actuatable inflatable restraint module, which has an inflatable restraint that is commonly referred to as an air bag. The restraint module is actuated and the air bag is inflated within a vehicle passenger compartment upon the occurrence of a condition for which a vehicle occupant is to be restrained. For example, a sensor senses a vehicle condition indicative of a deployment vehicle collision and, in response thereto, the restraint module is actuated.

The restraint module has one or more adjustable aspects, and in order to enhance performance of the restraint module, the adjustable aspect(s) are adjusted. Such a restraint module is commonly referred to as a "smart restraint." For example, in the inflatable restraint module, the deployment dynamic profile of the air bag is adjustable. Specifically, the inflation timing, the inflation pressure, the rate of inflation, and the positioning of the inflated air bag are all adjustable aspects. Adjustment of the restraint module is responsive to a sensed occupant condition.

The restraint system has a plurality of sensors for sensing the vehicle and occupant conditions. Information regarding the various sensed conditions must be processed in order to control actuation and adjustment of the restraint module.

SUMMARY OF THE INVENTION

The present invention provides an occupant restraint system for a vehicle. The system includes an occupant restraint device. Sensor means senses an occupant condition at a sensor rate and provides a signal indicative of the sensed occupant condition. Sample means samples the signal at a sample rate. Determination means makes a determination regarding control of the restraint device using the signal samples. Variation means varies at least one of the sensor rate and the sample rate in response to the signal samples.

In accordance with another aspect, the present invention provides a method for controlling an actuatable occupant restraint device for a vehicle. An occupant condition is sensed at a sensor rate. A signal indicative of the sensed occupant condition is provided. The signal is sampled at a sample rate. A determination is made regarding control of the restraint device using the signal samples. At least one of the sensor rate and the sample rate is varied in response to the signal samples.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF THE PREFERRED EMBODIMENTS

Figure 1:
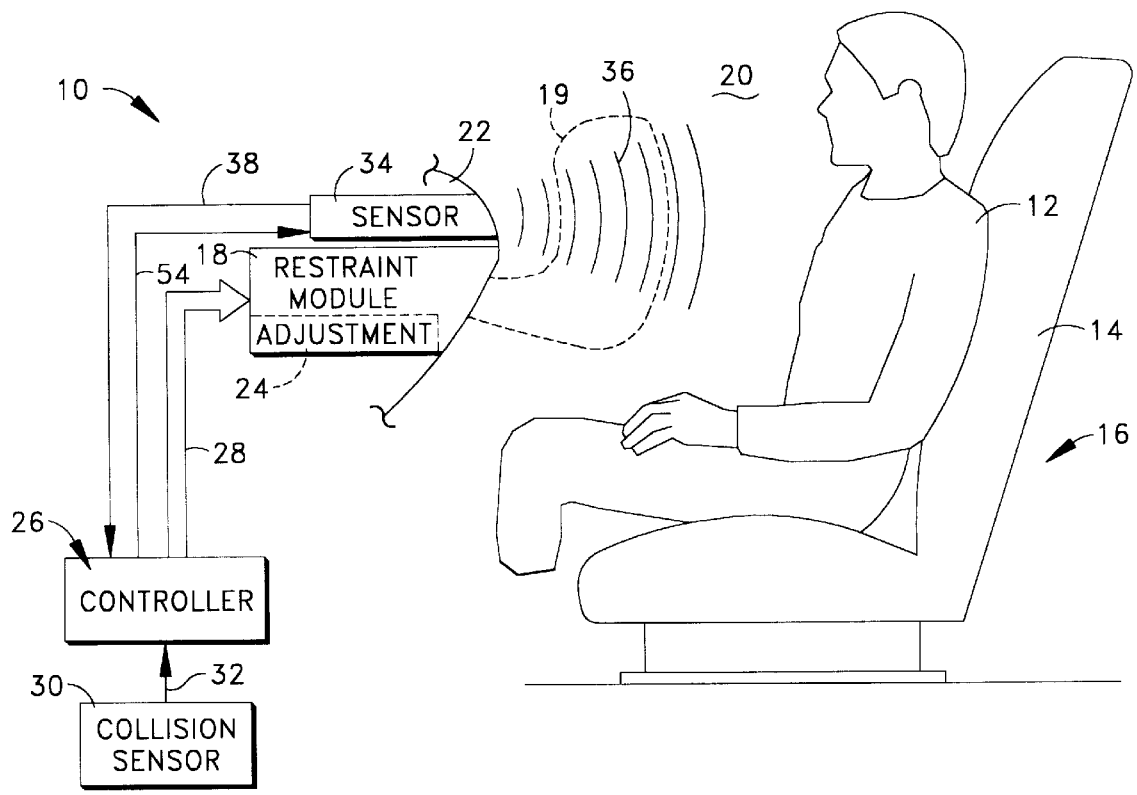
FIG. 1 is a schematic illustration of an occupant restraint system in accordance with the present invention within a vehicle.

An occupant restraint system 10 is schematically illustrated in FIG. 1. The system 10 is provided for an occupant 12 seated on a vehicle seat 14 within a vehicle 16. The system 10 includes an actuatable occupant restraint device 18. In one preferred embodiment, the restraint device 18 is an inflatable restraint module which includes an inflatable restraint 19, commonly referred to as an air bag. The air bag is inflatable within an occupant compartment 20 of the vehicle 16. Hereinafter, the restraint device 18 is referred to as the restraint module 18.

In the illustrated example, the restraint module 18 is located within a dashboard or instrument panel 22 of the vehicle 16 and is associated with the front passenger seat 14. It will be appreciated by a person of ordinary skill in the art that the restraint module 18 may be another type of inflatable restraint module (e.g., a driver's side restraint module) and may be located elsewhere within the vehicle (e.g., on the steering wheel). Also, it will be appreciated that the system 10 may include a plurality of actuatable restraint devices and that the system may include a restraint device other than an inflatable restraint module, such as an actuatable knee bolster or a seat belt system with an actuatable portion (e.g., a pretensioner).

The restraint module 18 has at least one adjustable aspect 24. For example, the deployment of the air bag is adjusted. Examples of an air bag deployment adjustment include adjustment of inflation timing, adjustment of inflation pressure, adjustment of location of the inflated air bag relative to the occupant 12, and adjustment of the dynamic profile of the air bag during inflation. A specific example of adjustment to inflation timing is selection of a time period between a determination to actuate the restraint module 18 and an initiation of air bag inflation. A specific example of adjustment of inflation pressure is control of a pressure relief valve which vents the air bag. A specific example of adjustment of air bag positioning is control of positioning motors operative to move the air bag housing. Another specific example of adjustment of air bag positioning is moving the entire restraint module toward or away from the occupant and/or moving the occupant toward or away from the restraint module. Dynamic profile control is accomplished by directing inflation fluid into the air bag in predetermined zones within the air bag or by control of the number and timing of a plurality of inflation sources and vent valves.

Control of the restraint device 18, to adjust the adjustable aspect(s) 24 and to cause actuation of the restraint device, is by a controller 26 which provides control signals 28 to the restraint device. In one example, the controller 26 is a microcomputer. The controller 26 receives sensory input from several sources and, using the sensory input, makes determinations regarding restraint device control.

One of the sensory input sources for the controller 26 is a sensor 30 that senses a vehicle condition for which the occupant 12 is to be restrained and provides a signal 32 to the controller 26 indicative of the sensed vehicle condition. In one example, which is illustrated in the figures, the sensor 30 is a collision sensor and senses a condition which is indicative of a vehicle collision. Preferably, the collision sensor 30 is an accelerometer, and the signal 32 is an electrical signal having a voltage value indicative of the sensed acceleration and/or a frequency value indicative of the sensed acceleration. In another example, the sensor 30 senses a condition indicative of a vehicle rollover. It should be appreciated by a person of ordinary skill in the art that the system 10 could have a plurality of sensors providing signals 32 to the controller 26 which are indicative of vehicle conditions for which the occupant 12 is to be restrained. Hereinafter, only the single collision sensor 30 and its collision indicative signal 32 are discussed.

Another sensory input source for the controller 26 is an ultrasound sensor 34 operatively mounted in the dash 22 so as to sense position of the occupant 12. In order to sense the occupant position, the ultrasound sensor 34 is energized to transmit an ultrasonic energy signal 36 toward the occupant 12. Ultrasonic energy is reflected from the occupant 12 back toward the ultrasound sensor 34. The ultrasound sensor 34 receives the reflected ultrasonic energy and generates a signal 38 indicative of the distance between the ultrasound sensor and the occupant 12. Specifically, the signal 38 is indicative of the elapsed time between the transmission and the reception. Elapsed time is proportionate to the distance between the ultrasound sensor 34 and the occupant 12. The signal 38 is provided to the controller 26. The ultrasound sensor 34 repeatedly cycles through transmission of the ultrasonic energy signal 36 and provision of the signal 38 at a rate which is referred to as a sensor rate. In one example, the sensor rate has a period on the order of milliseconds (e.g., one distance measurement every 5 milliseconds).

Alternatively, the sensor 34 could transmit a signal pulse when commanded by the controller 26 and provide an indication to the controller upon receipt of a return signal. The controller 26 would calculate the time difference between transmission and echo receipt and, in turn, determine occupant distance from the sensor.

The ultrasound sensor 34 is illustrated as being located within the dashboard 22 of the vehicle 16. A person of ordinary skill in the art will appreciate that the ultrasound sensor 34 may be located at any other suitable location within the vehicle 16 for sensing the occupant position. For example, the ultrasound sensor 34 may be located in the seat back of seat 14. Also, a person of ordinary skill in the art will appreciate that more than one sensor may be used and/or that another type of sensor may be used. For example, an infrared sensor may be used.

Figure 2:
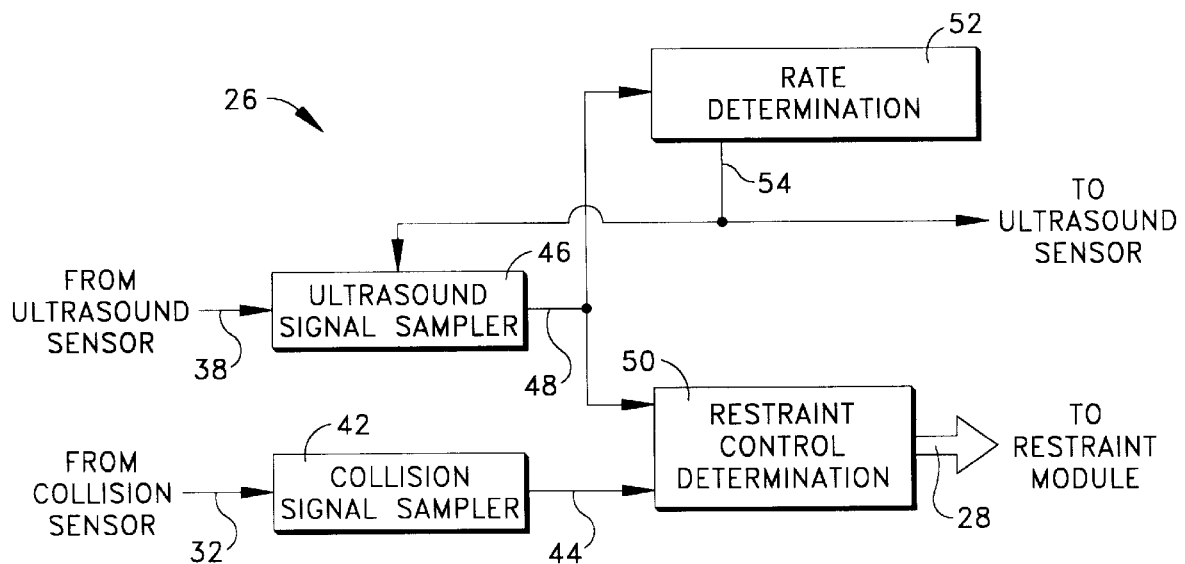
FIG. 2 is a schematic illustration of a portion of a controller shown within FIG. 1.

Based upon the input signals 32 and 38, the controller 26 provides the control signals 28 to the restraint module 18. Specifically, the controller 26 includes a collision signal sampler function 42 (FIG. 2) which samples the signal 32 from the collision sensor 30. Each time the signal 32 is sampled, the values (e.g., voltage amplitude and/or frequency) of the signal 32 are "read." Sampling of the signal 32 by the collision signal sampler function 42 occurs at a sample rate. In one example, the sample rate has a period on the order of milliseconds. The collision signal sampler function 42 outputs a signal 44 which is indicative of the "read" (i.e., sampled) signal values. If controller 26 is a microcomputer, the collision signal sampler would be an analog-to-digital ("A/D") input of the microcomputer.

The controller 26 includes an ultrasound signal sampler function 46 which samples the signal 38 from the ultrasound sensor 34. Each time the signal 38 is sampled, one or more signal values (e.g., amplitude, frequency) of the signal 38 are "read." Sampling of the signal 38 by the ultrasound signal sampler function 46 occurs at a sample rate. In one example, the sample rate had a period on the order of milliseconds. The ultrasound signal sampler function 46 outputs a signal 48 which is indicative of the "read" (i.e., sampled) signal values. Similarly, in a microcomputer embodiment, the sampler 46 would be another A/D input.

The signals 44 and 48 are provided to a restraint control determination function 50 of controller 26 which utilizes information regarding the sensed vehicle condition (i.e., from signal 32) and the information regarding the sensed occupant position (i.e., from signal 38) to make determinations regarding control of the restraint module 18. For example, the restraint control determination function 50 utilizes the information in an algorithm for determining whether to actuate the restraint module 18. In particular, the restraint control determination function 50 of the controller 26 uses the information contained within the signal 38 from the ultrasound sensor 34 to determine whether the occupant is moving at a speed which is indicative of the vehicle 16 being involved in a frontal collision.

The restraint control determination function 50 includes one or more algorithms for determining whether the vehicle 16 is involved in a deployment collision i.e., a collision in which it is desirable to actuate the restraint module 18. For example, the collision sensor 30 provides a signal indicative of a crash accelerometer. The restraint control determination function 50 includes means for integrating the sampled acceleration to provide a calculated crash vehicle velocity. When the crash velocity exceeds a threshold value, the restraint control determination function 50 concludes that the vehicle is involved in a deployment collision.

Focusing now on the occupant 12, the position of the occupant 12, relative to the dash 22, changes during a collision. Specifically, during a frontal collision of the vehicle 16, the vehicle decelerates and the inertia of the occupant causes the occupant to "slide" forward relative to the seat 14 toward the dashboard 22. In the example shown in FIG. 1, the occupant 12 is not secured by a seat belt webbing system. Thus, during a frontal collision the "un-belted" occupant 12 will move. Further, a person of ordinary skill in the art will appreciate that even a vehicle occupant secured by a seat belt webbing system moves some amount during a vehicle collision. For simplicity purposes only, the invention is described for the situation in which the occupant 12 is not secured by a seat belt webbing system (i.e., "un-belted").

Figure 3:
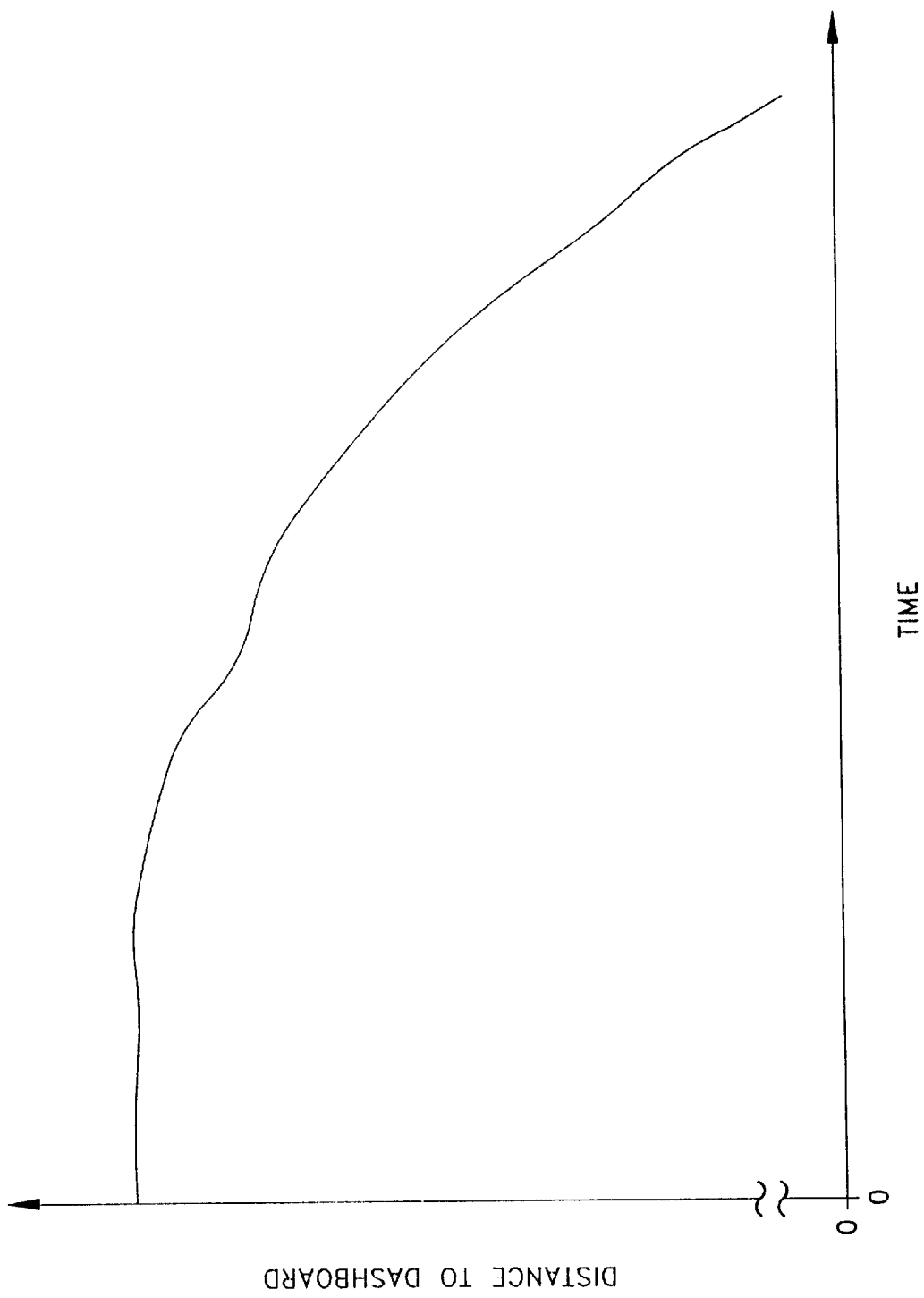
FIG. 3 is an illustration of distance between an unrestrained occupant and a vehicle dashboard as a function of time, upon the occurrence of a vehicle collision.

An example plot of the distance between the un-belted occupant 12 and the dashboard 22 during a frontal vehicle collision is shown in FIG. 3. In the plot of FIG. 3, the beginning of the collision is at time equals zero. During an initial time period, the position (i.e., the distance to the dashboard 22) of the occupant 12 is relatively constant. Subsequently, as the vehicle 16 continues to be decelerated, the inertial force of the occupant 12 overcomes the static force(s) holding the occupant (e.g., friction between the occupant and the seat bottom), and the distance between the occupant and the dashboard 22 decreases.

Figure 4:
FIG. 4 is an illustration of the derivative of the distance value shown in FIG. 3 as a function of time.

The relatively rapid changing position of the occupant 12, as sensed by the ultrasound sensor 34, is another indication of the occurrence of the vehicle collision. A plot of the derivative of the distance values shown in FIG. 3 as a function of time is plotted in FIG. 4. The plot of FIG. 4 is indicative of the velocity of the occupant 12 relative to the dashboard 22 (i.e., relative to the reference frame of the vehicle) during the collision. The calculated relative velocity of the occupant is indicative of the crash deceleration of the vehicle 16. In other words, the collision induced displacement of the occupant 12 provides a similar crash indication as does the accelerometer sensor 30.

During routine vehicle operation (i.e., the vehicle 16 is not currently involved in a collision) the occupant's position does not rapidly change. Further, during routine operation, the occupant 12 is not subject to inertia induced, rapid movement toward the dashboard 22, as would occur during a frontal collision. Thus, the position of the occupant need not be updated at a high frequency. The position of the occupant 12 during routine vehicle operation is generally static. Accordingly, in the present invention, the sensor rate of the ultrasound sensor 34 and the sample rate for sampling the signal 38 from the ultrasound sensor are adjustable to adjust the overall operation of the system 10. The sensor and sample rates have a default low setting. The sensor and sample rates are adjusted by increasing the rates from the default setting in accordance with sensed occupant movement and position.

The ultrasound sensor 34 may sense certain movements of the occupant, such as waving a hand, which should not be interpreted to be indicative of a vehicle collision (i.e., the waving hand is not inertia induced movement toward the dashboard 22). Such occupant movements as a hand wave are referred to herein as spurious movements. Control of the air bag is not in response to such spurious movements. Thus, the system 10 need not work to update the occupant position at a high frequency. Reducing the amount of updating reduces the burden or processing overhead on the control system. Further, sensing and sampling at lower rates tends to provide a filtering effect such that spurious movements are not interpreted to be indicative of a vehicle collision.

In order to adjust the sense and sample rates, the controller 26 includes a rate determination function 52. The output signal 48 from the ultrasound signal sampler function 46 is provided to the rate determination function 52. The signal 48 is processed by the rates determination function 52 so as to determine the sensor and sample rates.

Specifically, the rate determination function 52 of the controller 26 uses the position information contained within the signal 38 from the ultrasound sensor 34 to determine whether the movement of the occupant 12 is indicative of a frontal collision (e.g., whether the calculated occupant relative velocity exceeds a threshold). If the sensed occupant movement is indicative of a potential deployment collision (i.e., one in which it may be desirable to actuate the module 18), the rate determination function changes the sensor and sample rates to a higher rate. The sensor and sample rates are controlled via an output 54, which is connected to the ultrasound sensor 34 and the ultrasound signal sampler function 46.

Increasing the sensor and sample rates has the effect of increasing the amount of occupant position information 38 for processing by the controller 26. The increase in the amount of information permits a more detailed occupant position and movement analysis. Because frontal collisions are associated with relative occupant movement reducing the distance between the occupant and the dashboard, there is a need to update the occupant position faster.

Figure 5:
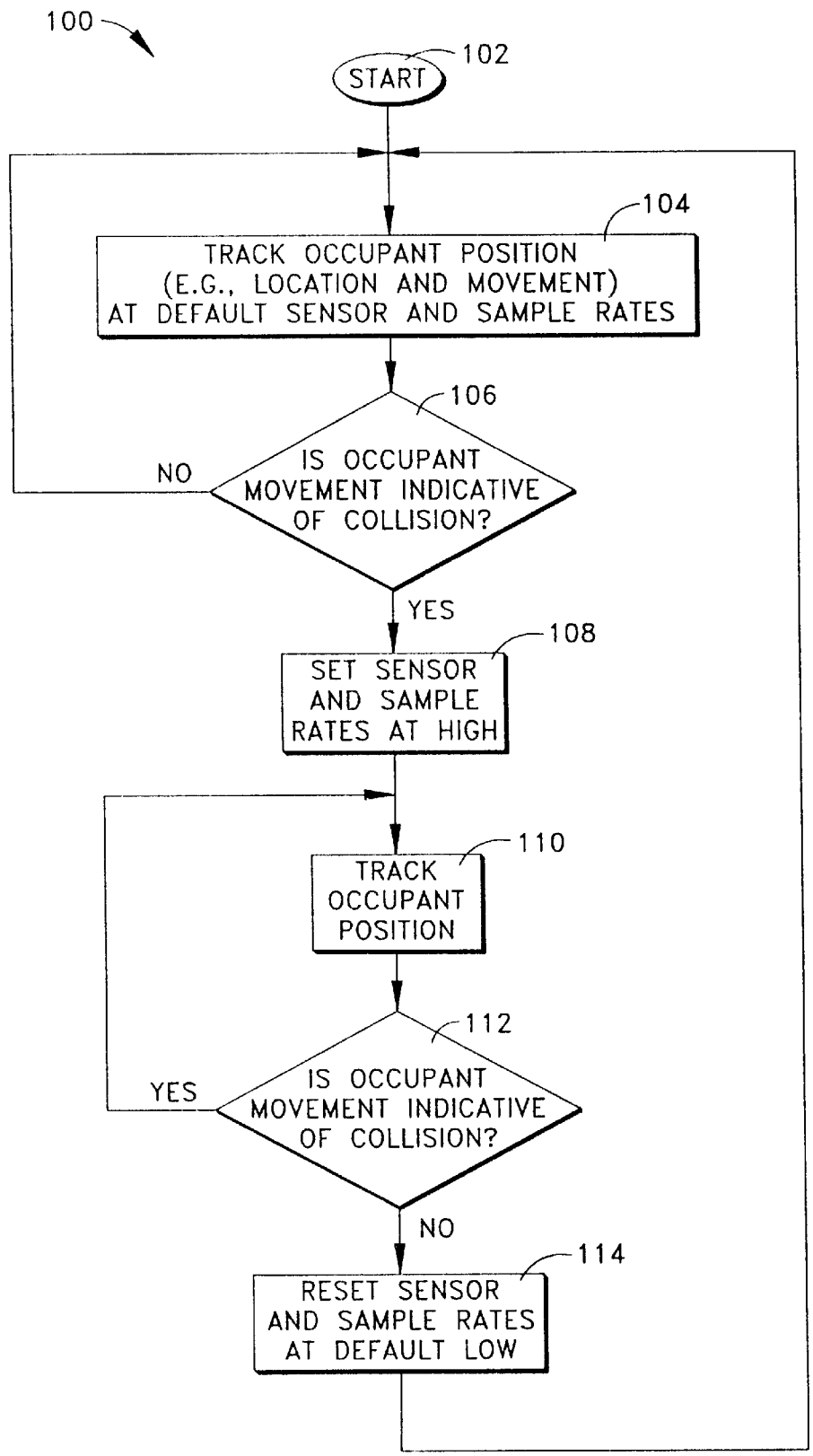
FIG. 5 is a flow chart for a rate determining process performed by the controller of FIG. 2.

A portion of a process 100 performed by the rate determination function 52 of the controller 26, in accordance with the present invention, is shown in FIG. 5. The process 100 is initiated at step 102 and proceeds to step 104. At step 104, the position of the occupant is tracked (e.g., the current occupant position and movement into the current position) using the ultrasound sensor 34 and ultrasound signal sampler function 46, both operating at a default, low rate setting. At step 106, it is determined whether the sensed occupant movement is indicative of a collision (i.e., a vehicle collision induced inertial movement of the occupant toward the sensor 34 and, in turn, toward the dashboard 22). If the determination at step 106 is negative (e.g., occupant movement is a waving hand of the occupant), the process 100 loops back to step 104. Those skilled in the art will appreciate that no occupant movement also results in a negative determination in step 106.

If the determination at step 106 is affirmative (i.e., collision indicative movement), the process 100 goes to step 108. At step 108, the sensor and sample rates are adjusted (i.e., reset) high. At step 110, the occupant position is tracked and, at step 112, it is determined whether sensed occupant movement continues to be indicative of the vehicle collision. If the determination at step 112 is affirmative (i.e., occupant movement is still indicative of a vehicle collision), the process 100 loops back to step 110. If the determination at step 112 is negative (i.e., occupant movement is no longer indicative of a vehicle collision), then the process goes to step 114. At step 114 the sense and sample rates are returned to the default low. The process 100 then loops back to step 104.

From the above description of the invention, those skilled in the art will perceive improvements, changes and modifications. For example, the sensor rate may be set different than the sample rate, or not set at all (e.g., the sensor is "ON" at a constant rate). Also, for example, any or all portions of the functions performed within the controller 26 may be performed by hardwired components or by computing devices using software, or by a combination thereof. Such improvements, changes, and modifications within the skill of the art are intended to be covered by the appended claims.

Having described the invention, the following is claimed:

1. An occupant restraint system for a vehicle, said system comprising:

an occupant restraint device;

sensor means for sensing an occupant condition at a sensor rate and for providing a signal indicative of the sensed occupant condition;

means for sampling said signal at a sample rate;

determination means for making a determination regarding control of said restraint device using the signal samples; and variation means for varying at least one of said sensor rate and said sample rate in response to the signal samples.

2. A system as set forth in claim 1, wherein said sensor means includes means for sensing occupant position, and the signal provided by said sensor means is indicative of the occupant position.

3. A system as set forth in claim 2, wherein said variation means includes means for increasing said at least one of said sensor rate and said sample rate in response to occupant movement indicative of a vehicle collision.

4. A system as set forth in claim 3, wherein said means for increasing said at least one of said sensor rate and said sample rate is responsive to occupant movement indicative of a frontal vehicle collision.

5. A system as set forth in claim 1, wherein said sensor rate and said sample are at a low rate prior to a beginning of a vehicle collision and are at a high rate subsequent to the beginning of the vehicle collision.

6. A system as set forth in claim 1, wherein said sensor means includes means for transmitting a signal toward an occupant and means for receiving a reflected signal from the occupant.

7. A system as set forth in claim 6, wherein said sensor means includes an ultrasound sensor.

8. A method for controlling an occupant restraint device in an occupant restraint system for a vehicle, said method comprising:

sensing an occupant condition at a sensor rate;

providing a signal indicative of the sensed occupant condition;

sampling the signal at a sample rate;

making a determination regarding control of the restraint device using the signal samples; and varying at least one of the sensor rate and the sample rate in response to the signal samples.

9. A method as set forth in claim 8, wherein said step of sensing includes sensing occupant position, and said step of providing a signal includes providing the signal to be indicative of the sensed occupant position.

10. A method as set forth in claim 9, wherein said step of varying includes increasing the at least one of the sensor rate and the sample rate in response to occupant movement indicative of a vehicle collision.

11. A method as set forth in claim 10, wherein said step of increasing the at least one of the sensor rate and the sample rate is responsive to occupant movement indicative of a frontal vehicle collision.

12. A method as set forth in claim 8, wherein said step of varying is such that the sensor rate and the sample are at a low rate prior to a beginning of a vehicle collision and are at a high rate subsequent to the beginning of the vehicle collision.

13. A method as set forth in claim 8, wherein said step of sensing includes transmitting a signal toward an occupant and receiving a reflected signal from the occupant.

14. A method as set forth in claim 13, wherein said step of sensing includes using an ultrasound sensor.

* * * * *